INVENTOR
RAFFAELLO BENASSI

ATTORNEY.

United States Patent Office 3,400,914
Patented Sept. 10, 1968

3,400,914
MOISTENING APPARATUS PARTICULARLY FOR USE IN MIXING ARGILLACEOUS PRODUCTS
Raffaello Benassi, Via F. Turati 4, Sassuolo, Modena, Italy
Filed June 17, 1966, Ser. No. 558,439
4 Claims. (Cl. 259—8)

ABSTRACT OF THE DISCLOSURE

A moistening apparatus for argillaceous products comprising a hopper having an opening at its top for receiving the products. A housing is disposed below the hopper and a cone is mounted in the housing with its apex pointing upwardly for receiving the products from the hopper. A tank is disposed at the bottom of the housing and a mixing reel having blades secured thereto is rotatably mounted in the tank, the tank having an outlet for removing the products therefrom. A pan is rotatably mounted below the cone and means for feeding water from the water tank into the pan is provided. Due to the rotation of the pan, water is sprayed upon the products falling off the cone into the first-mentioned tank, and means are provided for operatively sensing the products received through the opening of the hopper and for controlling the feeding means to control the amount of water fed onto the pan in proportion to the quantity of the products passing through the hopper.

---

The present invention relates to a moistening apparatus, particularly for argils, kaolin and other similar products.

It is one object of the present invention to provide a moistening apparatus, which permits a continuous production of moistened material and which includes an atomizing dish rotating at a predetermined speed.

It is another object of the present invention to provide a moistening apparatus which brings about the atomizing of the water and which is adapted to the characteristics of the material to be moistened.

It is still another object of the present invention to provide a moistening apparatus, wherein the liquid is automatically discharged from the apparatus in case of stoppage of the working in order to avoid that the water wets excessively the material.

Figure 1:
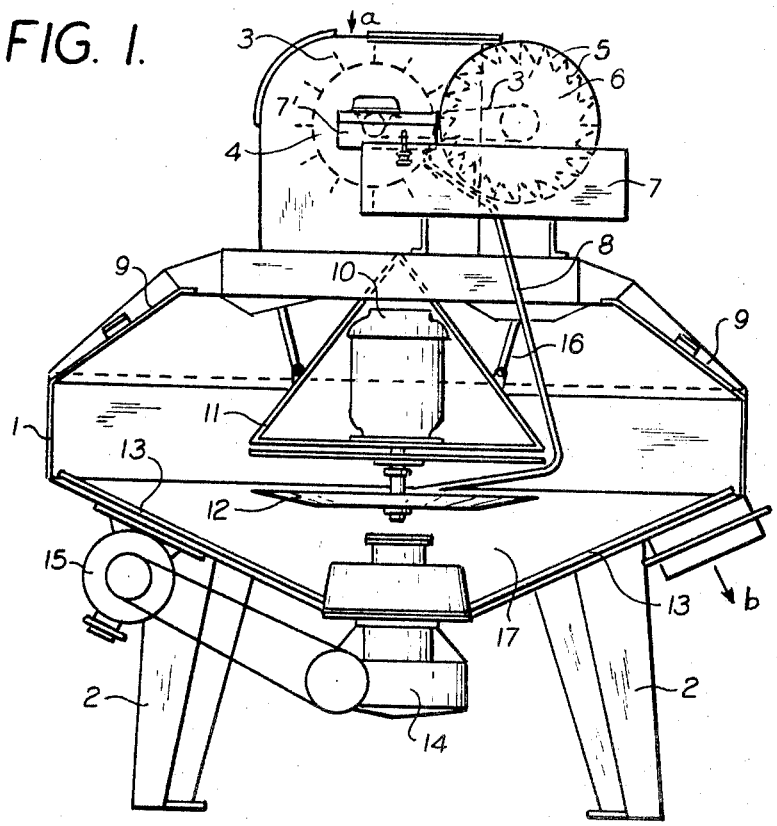
Figure 2:
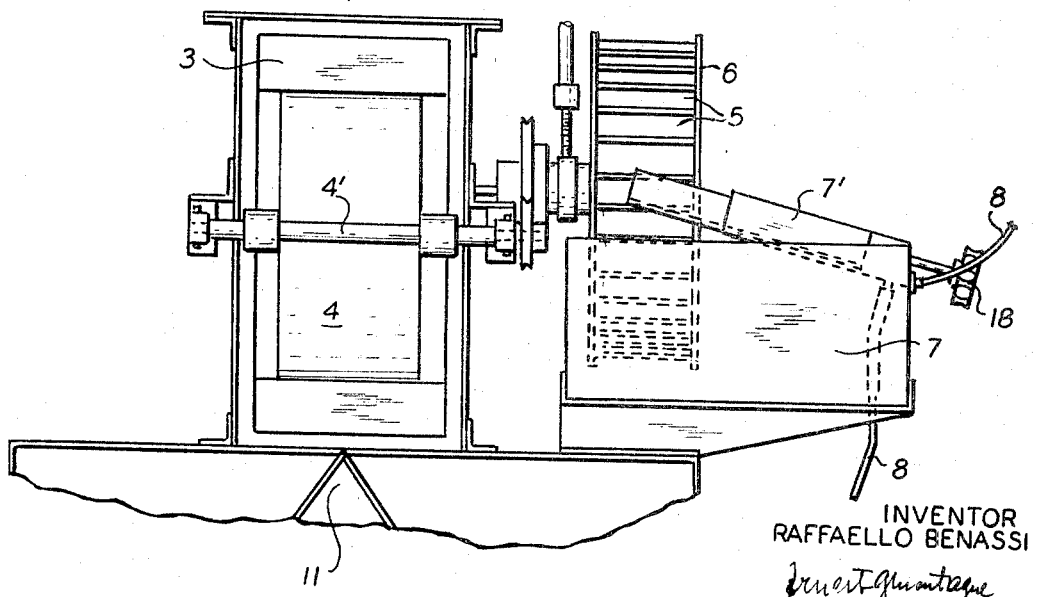

With these and other objects in view, which will become apparent in the following detailed description, the present invention will be clearly understood in connection with the accompanying drawings, in which:

FIGURE 1 is a front elevation of the apparatus, designed in accordance with the present invention; and FIG. 2 is a side elevation of the top section of the rotatory system of the apparatus, of which the rotatory motion is given by the weight of the material entering, that falls on the blades of the drum.

Referring now to the drawings, the apparatus comprises a hopper a, receiving the material to be moistened, which falls onto blades 3 of a cylinder 4, thereby rotating the cylinder 4, which in turn drives a cylinder 6 which is equipped with water feeding containers 5.

The hopper a is open at its bottom, permitting the material to fall from the cylinder 4 onto a cone 11, which, due to its characteristic shape, causes the material to spread, and to distribute the latter over a wider surface slowly as it descends, until it leaves the base of the cone 11 in form of a thin spread, and falling thereafter into a tank 17, disposed below the cone 11.

A mixing reel having blades 13 is rotatably mounted in the tank 17, and due to their rotation, mixes up the material in a rational manner. After terminating the mixing period, the material, which is homogenized, emerges through an outlet b.

Referring now to FIG. 2 of the drawings, the cylinder 4 turns about the shaft 4' and drives the feeding cylinder 6, which includes the containers 5 of triangular shape, with the vertex turned towards the center of the cylinder 6.

When the material to be moistened falls by its own gravity onto the blades 3, causing rotation of the cylinder 4, a belt drive 3' connecting the cylinders 4 and 6 turns the cylinder 6 and, thereby, lifts the containers 5. The cylinder 6 is partly submerged in a tank 7, filled with water, lifted by the containers 5 and to be returned at least partly to a collector 7'. The containers 5 are arranged such, that the water pours down from the containers 5 in separate streams.

A pan 12 is provided on the top of the tank, below the cone 11 and the water is fed from the collector 7' to the center of the pan 12, by means of a tube 8, which pan 12 is rotated by an electric motor 10, which is disposed in and protected by the cone 11.

The material to be moistened moves slowly from the cone 11, and the water is fed continuously from the collector 7' into the pan 12 in response to the weight of the falling material. Due to the rotation of the rotating pan 12, the centrifugal force forces the water radially out of the pan 12, in form of fog or mist, and engages the material removed from the lower edge of the cone 11. The material which is spread over a wide surface, passing through the atomized water spray, is moistened immediately and uniformly. The mixing reels 13, which receive the moistened material, may be equipped with blades of such shape, that during the rotation in the tank 17 the material is moved and turned upon itself, from the center of the tank 17, towards its periphery and thereafter emerges from the exit or outlet opening b.

During the predetermined rotary movement, the mixed material moves from the center towards the periphery of the reels 13 leaving free simultaneously the center zone, in which additional material is received from the cone 11.

It is quite apparent, that as soon as the operation starts, there is obtained a continuous production, because there is an uninterrupted fall of unmoistened material, and a continuous removal of moistened material through the outlet opening b, to which the desired percentage of humidity or moisture has been applied.

The water collector 7' is mounted on a fixed base such, that it can move forward or backward within the tank 7 by any conventional means, as a threaded rod operated by means of a knob 18, and by this arrangement may collect more or less water, since the number of containers 5 receiving water may be varied.

This adjustment permits thus the control of the percentage of water to be supplied to the material to be moistened.

The plate 12, which is of concave shape, has in the center an opening, in order to permit the discharge of water remaining therein, if for any reason the plate 12 should cease to rotate, so that the water is removed therefrom into the tank 17.

The mixing reels 13 are driven by means of a reduction gear 14 operated by a motor 15, over a belt drive. The cone 11, the motor 10 and the dish 12 are supported by arms 16, suspended from a housing 1, and the apparatus is carried by supporting legs 2.

The housing 1 is equipped with small doors 9 which permit the operation and the control of the apparatus.

While I have disclosed one embodiment of the present invention, it is to be understood that this embodiment is given by example only and not in a limiting sense, the scope of the present invention being determined by the objects and the claims.

I claim:
1. A moistening apparatus for argillaceous products comprising
   a hopper having an opening at its top,
   a cylinder within said hopper having blades radially extending from its periphery and adapted to receive said products and to be turned by the gravity force of said products,
   a housing disposed below said hopper,
   a cone mounted in said housing with its apex pointing upwardly and receiving said products from said blades of said cylinder and spreading said products laterally,
   a tank disposed at the bottom of said housing,
   a mixing reel having blades secured thereto rotatably mounted in said tank,
   said tank having an outlet for removing said products therefrom,
   a feeding cylinder carrying a plurality of containers disposed along its periphery and rotatably mounted,
   means operatively connected with said first mentioned cylinder for rotating said feeding cylinder from said first mentioned cylinder,
   a water tank receiving water and having said feeding cylinder partly submerged therein, so that upon rotation of said feeding cylinder said containers remove water from said water tank,
   a collector disposed below said feeding cylinder and receiving water from said containers,
   a pan rotatably mounted below said cone, and
   a tube feeding continuously water from said collector into said pan and due to the rotation of said pan, water is sprayed upon said products falling off said cone into said first mentioned tank.

2. The apparatus, as set forth in claim 1, which includes
   means for varying the vertical position of said collector relative to said water tank in order to control the amount of water fed to said pan.

3. The apparatus, as set forth in claim 1, which includes
   a reduction gear disposed below the center of said first mentioned tank, and driving said reel,
   an electric motor secured to the outer wall of said tank operating said reduction gear.

4. A moistening apparatus for argillaceous products, comprising
   a hopper having an opening at its top for receiving said products,
   a housing disposed below said hopper,
   a cone mounted in said housing with its apex pointing upwardly and receiving said products from said hopper,
   a tank disposed at the bottom of said housing,
   a mixing reel having blades secured thereto rotatably mounted in said tank,
   said tank having an outlet for removing said products therefrom,
   a water tank receiving water,
   a pan rotatably mounted below said cone,
   means for feeding water from said water tank onto said pan and due to the rotation of said pan, water is sprayed upon said products falling off said cone into said first-mentioned tank, and
   means for operatively sensing said products received through said opening of said hopper and for controlling said feeding means to control the amount of water fed onto said pan in proportion to the quantity of said products passing through said hopper.

References Cited

UNITED STATES PATENTS

| | | | |
|---|---|---|---|
| 2,862,511 | 12/1958 | Forsberg | 259—8 XR |
| 2,953,359 | 9/1960 | Mau | 259—8 |

WALTER A. SCHEEL, *Primary Examiner.*

J. M. BELL, *Assistant Examiner.*